(12) United States Patent
Dou et al.

(10) Patent No.: US 12,288,947 B2
(45) Date of Patent: Apr. 29, 2025

(54) CHARGING SOCKET

(71) Applicants: Tyco Electronics Technology (SIP) Ltd., Suzhou (CN); Tyco Electronics (Shanghai) Co., Ltd., Shanghai (CN)

(72) Inventors: Renyi Dou, Suzhou (CN); Fangyue Zhu, Shanghai (CN); Qun Zhang, Suzhou (CN)

(73) Assignees: Tyco Electronics Technology (SIP) Ltd., Suzhou (CN); Tyco Electronics (Shanghai) Co., Ltd., Shanghai (CN)

( * ) Notice: Subject to any disclaimer, the term of this patent is extended or adjusted under 35 U.S.C. 154(b) by 401 days.

(21) Appl. No.: 17/738,079

(22) Filed: May 6, 2022

(65) Prior Publication Data

US 2022/0360028 A1 Nov. 10, 2022

(30) Foreign Application Priority Data

May 7, 2021 (CN) .......................... 202120954231.1

(51) Int. Cl.
*H01R 13/66* (2006.01)
*G01K 13/00* (2021.01)
(Continued)

(52) U.S. Cl.
CPC ......... *H01R 13/6683* (2013.01); *G01K 13/00* (2013.01); *H01R 4/023* (2013.01);
(Continued)

(58) Field of Classification Search
CPC ...... H01R 13/6683; H01R 4/023; H01R 4/18; H01R 13/11; H01R 13/6278;
(Continued)

(56) References Cited

U.S. PATENT DOCUMENTS

| 10,547,131 B2 * | 1/2020 | Feldner ................. H01R 27/02 |
| 2015/0054462 A1 * | 2/2015 | Weidinger ............. B60L 53/16 320/109 |

(Continued)

FOREIGN PATENT DOCUMENTS

| CN | 210692864 U | * | 6/2020 |
| CN | 211789701 U | * | 10/2020 |
| JP | 2011070831 A | * | 4/2011 |

*Primary Examiner* — Tulsidas C Patel
*Assistant Examiner* — Jeffrey Mountain
(74) *Attorney, Agent, or Firm* — Potomac Law Group, PLLC

(57) ABSTRACT

A charging socket has a housing; a charging terminal installed in the housing; an electric adapter installed in the housing; and a temperature sensor for detecting the temperature of the charging terminal. The electric adapter has a body and a connection terminal provided in the body, and the connection terminal has an input end and an output end. The temperature sensor has a flexible lead, which is electrically connected to the input end of the connection terminal, so as to transmit the sensing signal of the temperature sensor to the output end of the connection terminal. The flexible lead of the temperature sensor is electrically connected to the connection terminal of the electric adapter in the charging socket without passing through the rear cover of the charging socket.

9 Claims, 7 Drawing Sheets

(51) Int. Cl.
*H01R 4/02* (2006.01)
*H01R 4/18* (2006.01)
*H01R 13/11* (2006.01)
*H01R 13/627* (2006.01)

(52) U.S. Cl.
CPC ............... *H01R 4/18* (2013.01); *H01R 13/11* (2013.01); *H01R 13/6278* (2013.01)

(58) Field of Classification Search
CPC ............ H01R 13/6658; H01R 2201/26; G01K 13/00; G01K 1/14; G01K 1/16; B60L 53/302; B60L 2240/36; B60L 53/16; B60Y 2400/302
USPC ..................................................... 439/620.22
See application file for complete search history.

(56) References Cited

U.S. PATENT DOCUMENTS

2019/0293493 A1* 9/2019 Meissner ............. H01R 13/665
2021/0078419 A1* 3/2021 Lyon ........................ G01K 1/14

* cited by examiner

CHARGING SOCKET

CROSS-REFERENCE TO RELATED APPLICATION

This application claims the benefit of Chinese Patent Application No. 202120954231.1 filed on May 7, 2021 in the State Intellectual Property Office of China, the whole disclosure of which is incorporated herein by reference.

BACKGROUND OF THE INVENTION

Field of the Invention

The present invention relates to a charging socket.

Description of the Related Art

In the prior art, the charging socket of the new energy electric vehicle needs to be equipped with a temperature sensor to monitor the temperature of the charging terminal when the user is charging and avoid abnormal charging. In the prior art, when a lead-in temperature sensor is used, the lead of the temperature sensor passes through the rear cover of the charging socket and is electrically connected to the control system of the electric vehicle. This installation structure not only needs to set a lead perforation to allow the lead to pass through the rear cover of the charging socket, but also needs to set a seal in the lead perforation, which leads to complex product structure, reduces the installation efficiency of the temperature sensor, and increases the manufacturing cost.

SUMMARY OF THE INVENTION

The present invention has been made to overcome or alleviate at least one aspect of the above mentioned disadvantages.

According to an aspect of the present invention, there is provided a charging socket comprising of: a housing; a charging terminal installed in the housing; an electric adapter installed in the housing; and a temperature sensor for detecting the temperature of the charging terminal. The electric adapter comprises a body and a connection terminal provided in the body, and the connection terminal has an input end and an output end. The temperature sensor has a flexible lead, which is electrically connected to the input end of the connection terminal, so as to transmit the sensing signal of the temperature sensor to the output end of the connection terminal.

According to another exemplary embodiment of the present invention, the charging socket further comprises a first connector for connecting the flexible lead of the temperature sensor and the input end of the connection terminal of the electric adapter.

According to another exemplary embodiment of the present invention, the first connector comprises a first housing and a first terminal installed in the first housing, and the flexible lead of the temperature sensor is electrically connected to the first terminal; the first terminal is adapted to be mated with the input end of the connection terminal to electrically connect the flexible lead of the temperature sensor to the input end of the connection terminal.

According to another exemplary embodiment of the present invention, the electric adapter is a lead frame, and the body is a frame body of the lead frame; a first slot for inserting the first connector is formed on the body, and the input end of the connection terminal is arranged in the first slot; when the first connector is inserted into the first slot, the first terminal of the first connector is mated with the input end arranged in the first slot.

According to another exemplary embodiment of the present invention, a first protrusion is formed on one of the first housing of the first connector and an inner wall of the first slot, and a first snap slot is formed on the other; when the first connector is inserted into the first slot, the first protrusion is buckled into the first snap slot to lock the first connector in the first slot.

According to another exemplary embodiment of the present invention, wherein the temperature sensor is mounted on the body.

According to another exemplary embodiment of the present invention, wherein the flexible lead of the temperature sensor is welded, riveted or crimped to the input end.

According to another exemplary embodiment of the present invention, the charging socket further comprises a heat conduction pad for thermally contacting with the charging terminal, the temperature sensor is installed in the heat conduction pad to be thermally connected with the charging terminal via the heat conduction pad.

According to another exemplary embodiment of the present invention, a socket is formed on the heat conduction pad, and the temperature sensor is inserted into the socket of the heat conduction pad; or the heat conduction pad is a molded part formed on the temperature sensor, so that the temperature sensor is encapsulated in the heat conduction pad.

According to another exemplary embodiment of the present invention, the electric adapter is a lead frame, and the body is a frame body of the lead frame; a mounting slot is formed on the body, and the heat conduction pad is installed in the mounting slot; and/or a positioning column is formed on the body, and a positioning hole mated with the positioning column is formed on the heat conduction pad.

According to another exemplary embodiment of the present invention, the electric adapter is a lead frame, and the body is a frame body of the lead frame; the heat conduction pad is fixedly installed on the body.

According to another exemplary embodiment of the present invention, the electric adapter is a lead frame, and the body is a frame body of the lead frame; a second slot for inserting a second connector is formed on the body, and the output end of the connection terminal is arranged in the second slot; when the second connector is inserted into the second slot, a second terminal of the second connector is mated with the output end of the connection terminal to electrically connect the output end of the connection terminal to a control system of an electric vehicle.

According to another exemplary embodiment of the present invention, a second protrusion is formed on one of a second housing of the second connector and an inner wall of the second slot, and a second snap slot is formed on the other; when the second connector is inserted into the second slot, the second protrusion is buckled into the second snap slot to lock the second connector in the second slot.

According to another exemplary embodiment of the present invention, the electric adapter is a circuit board.

According to another exemplary embodiment of the present invention, the electric adapter is an integral part formed by insert injection molding, the connection terminal is an insert part, and the body is an injection molded part formed on the connection terminal; the input end and the output end of the connection terminal extend outside the body respectively for electrical connection.

According to another exemplary embodiment of the present invention, the charging socket further comprises a rear cover which is fixedly connected with a rear end of the housing to form a rear end cavity; the flexible lead of the temperature sensor is completely arranged in the rear end cavity.

In the foregoing exemplary embodiments according to the present invention, the flexible lead of the temperature sensor is electrically connected to the connection terminal of the electrical adapter in the charging socket without passing through the rear cover of the charging socket. Therefore, the installation of the temperature sensor and the structure of the charging socket are simplified, the assembly efficiency is improved, and the production cost is reduced.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
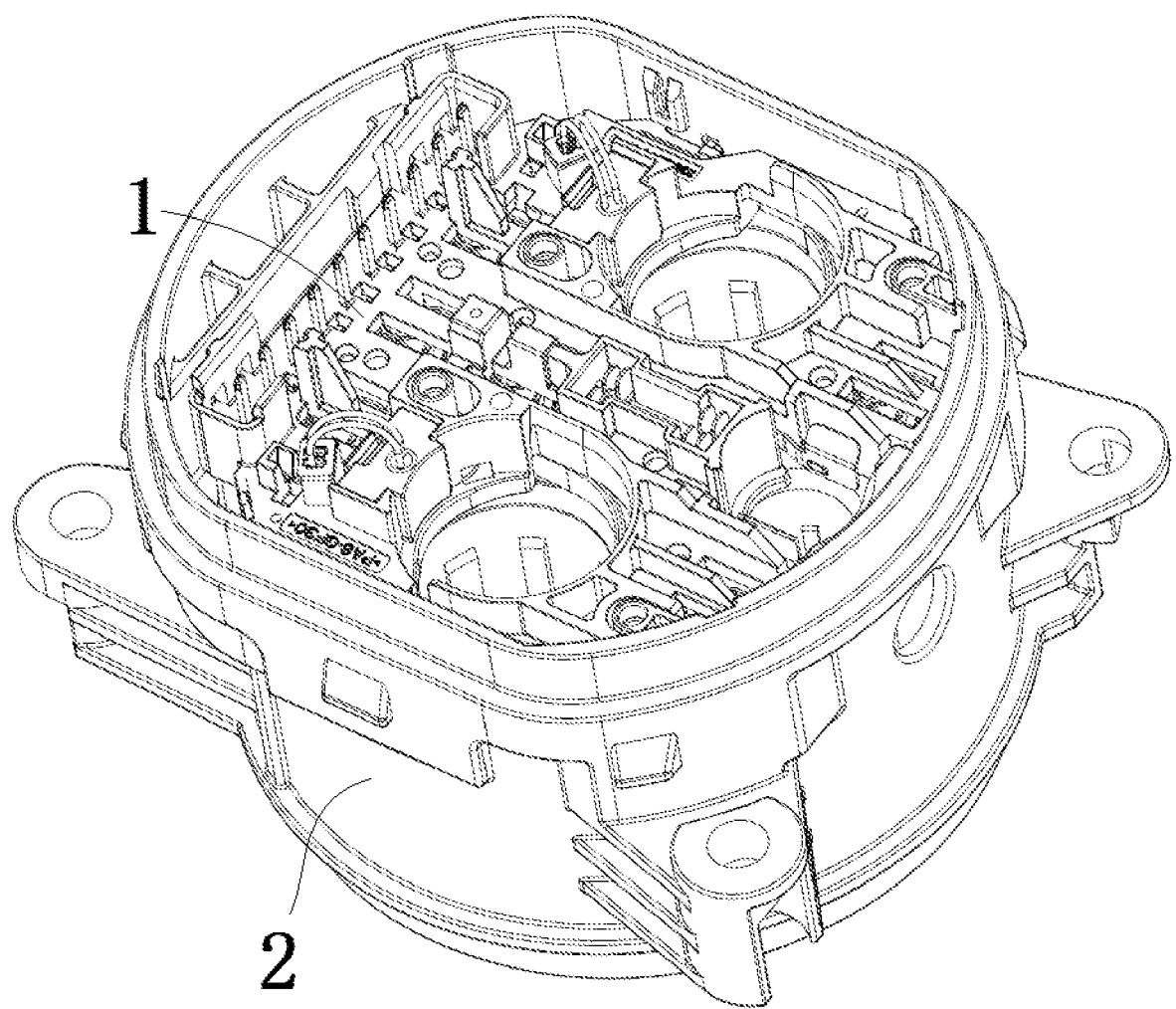
FIG. 1 shows a three-dimensional schematic diagram of a charging socket according to an exemplary embodiment of the present invention, wherein the rear cover of the charging socket is removed to display the internal electronic assembly.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a charging socket comprising of: a housing; a charging terminal installed in the housing; an electric adapter installed in the housing; and a temperature sensor for detecting the temperature of the charging terminal. The electric adapter comprises a body and a connection terminal provided in the body, and the connection terminal has an input end and an output end. The temperature sensor has a flexible lead, which is electrically connected to the input end of the connection terminal, so as to transmit the sensing signal of the temperature sensor to the output end of the connection terminal.

Figure 2:
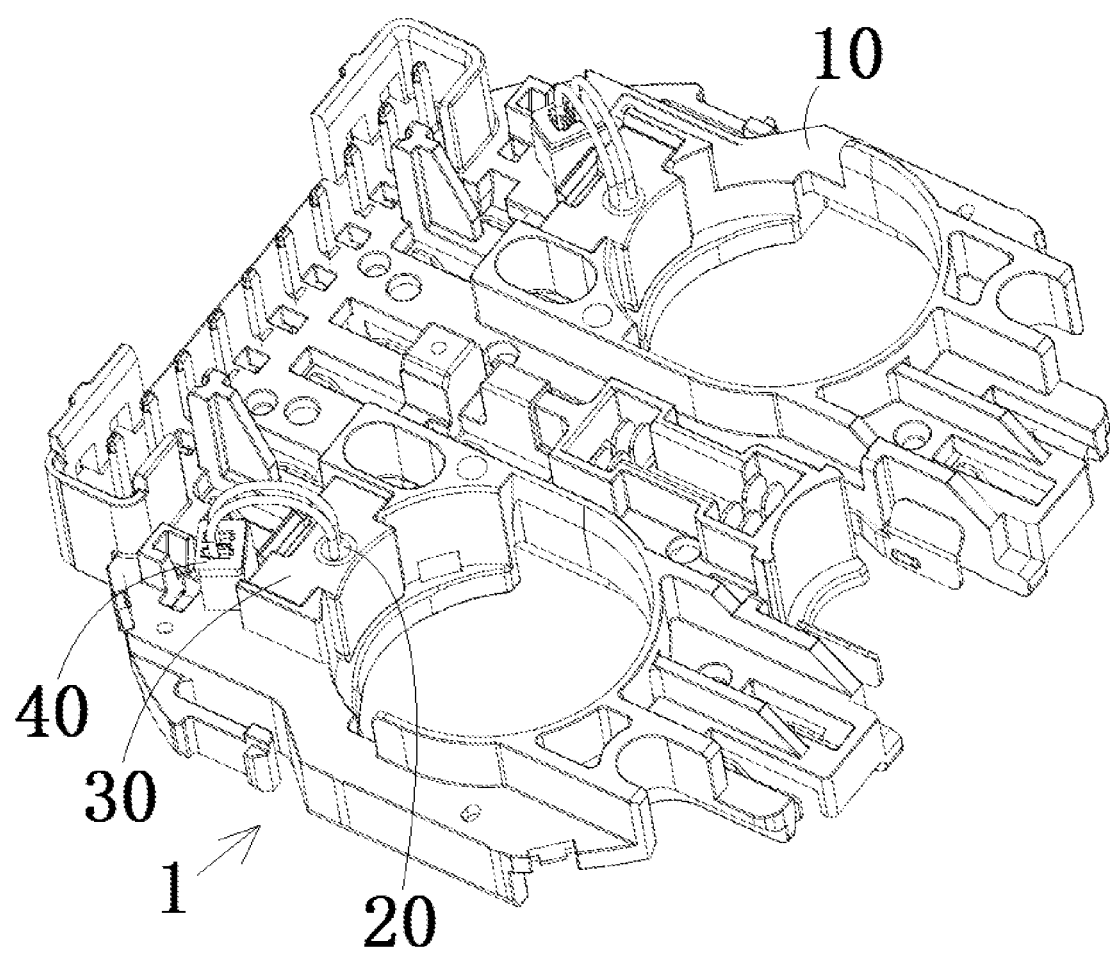
FIG. 2 shows an illustrative perspective view of the charging socket of FIG. 1.

FIG. 1 shows a three-dimensional schematic diagram of a charging socket according to an exemplary embodiment of the present invention, in which the rear cover 3 of the charging socket is removed to display the internal electronic assembly 1; FIG. 2 shows a three-dimensional schematic diagram of the electronic assembly 1 in FIG. 1.

As shown in FIGS. 1 and 2, in the illustrated embodiment, the charging socket mainly includes a housing 2, a charging terminal (not shown) installed in the housing 2, and an electronic assembly 1.

Figure 3:
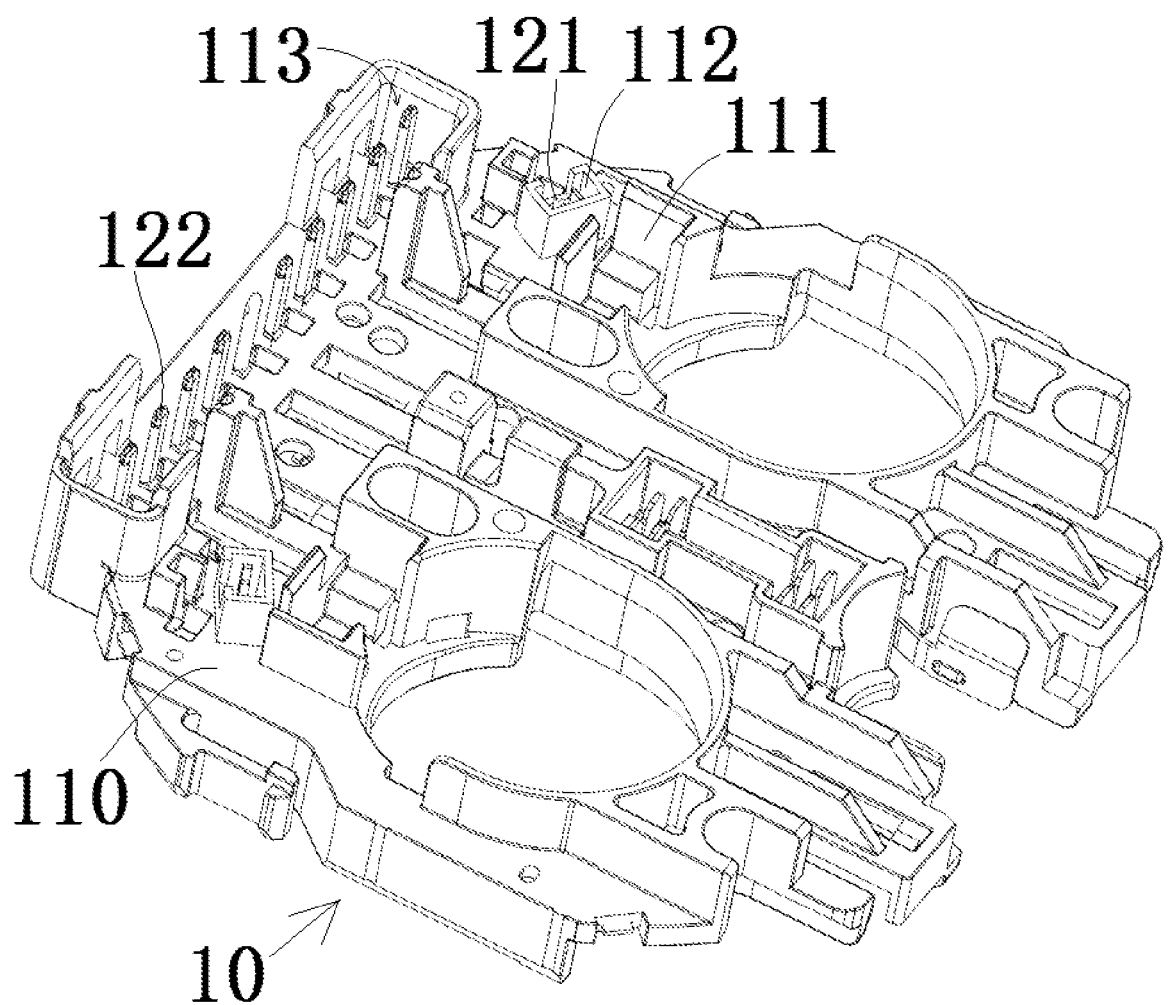
FIG. 3 shows a three-dimensional schematic diagram of the lead frame in FIG. 2.
Figure 4:
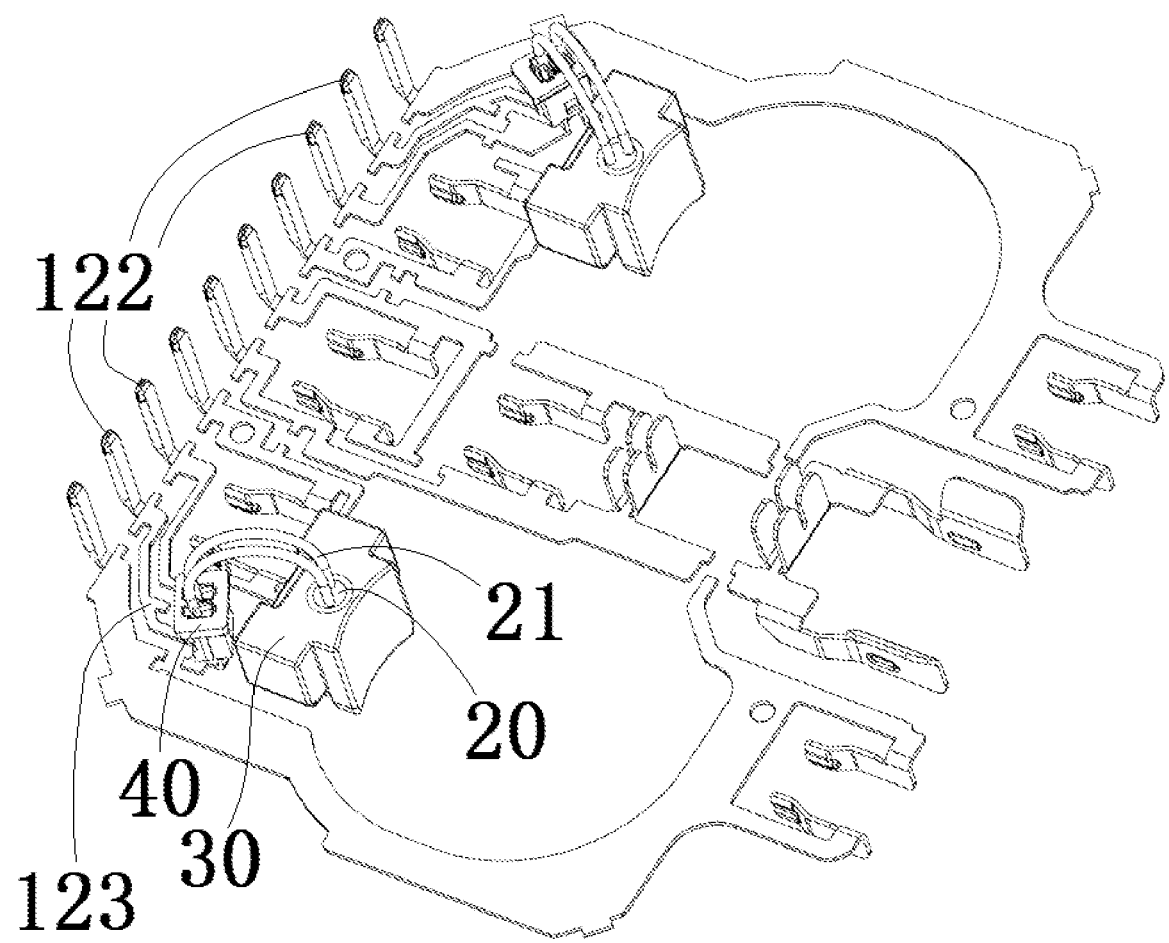
FIG. 4 shows a three-dimensional schematic diagram of the charging socket shown in FIG. 2, in which the frame body of the lead frame is removed to show the electrical connection structure of the connection terminal.

FIG. 3 shows a three-dimensional schematic diagram of the electric adapter 10 in FIG. 2; FIG. 4 shows a three-dimensional schematic diagram of the electronic assembly 1 shown in FIG. 2, in which the body 110 of the electrical adapter 10 is removed to show the electrical connection structure of the connection terminal 123.

As shown in FIGS. 1 to 4, in the illustrated embodiment, the electronic assembly 1 mainly includes an electrical adapter 10 and a temperature sensor 20. The electrical adapter 10 includes a body 110 and an connection terminal 123 arranged in the body 110. The connection terminal 123 has an input end 121 and an output end 122. The temperature sensor 20 is installed on the body 110 to detect the temperature of the charging terminal (not shown) installed in the housing 2.

Figure 5:
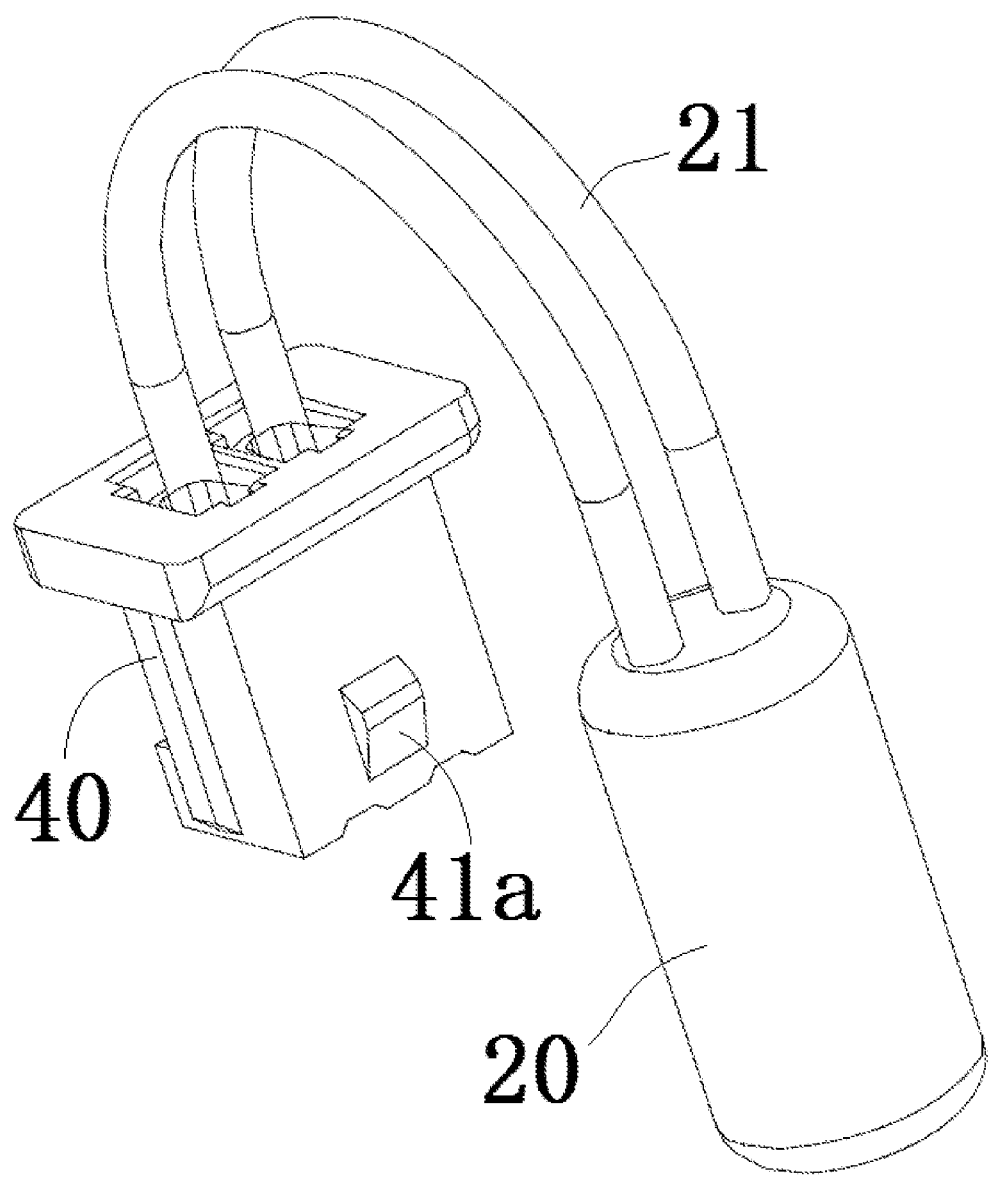
FIG. 5 shows a schematic diagram of the temperature sensor and the first connector of the charging socket shown in FIG. 2.

FIG. 5 shows a schematic diagram of the temperature sensor 20 and the first connector 40 of the electronic assembly 1 shown in FIG. 2.

As shown in FIGS. 1 to 5, in the illustrated embodiment, the temperature sensor 20 has a flexible lead 21, which is electrically connected to the input end 121 of the connection terminal 123 of the electrical adapter 10, so as to transmit the sensing signal of the temperature sensor 20 to the output end 122 of the connection terminal 123.

As shown in FIGS. 1 to 5, in the illustrated embodiment, the electronic assembly 1 also includes a first connector 40. The first connector 40 is used to electrically connect the flexible lead 21 of the temperature sensor 20 to the input end 121 of the connection terminal 123 of the electrical adapter 10.

Figure 6:
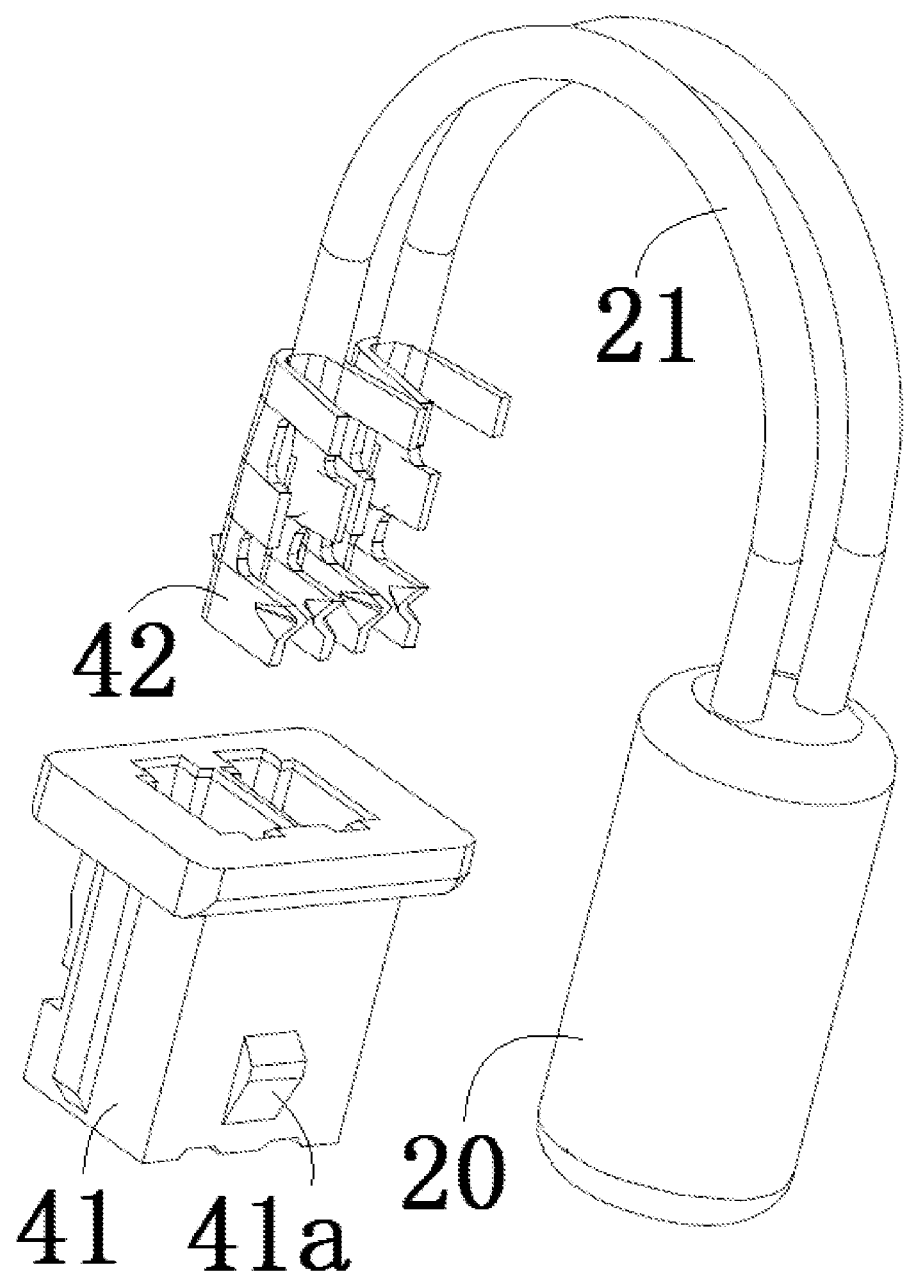
FIG. 6 shows a schematic diagram of the temperature sensor and the first connector shown in FIG. 5, wherein the first connector is decomposed to show the first terminal.

FIG. 6 shows a schematic diagram of the temperature sensor 20 and the first connector 40 shown in FIG. 5, wherein the first connector 40 is decomposed to show the internal first terminal 42.

As shown in FIGS. 1 to 6, in the illustrated embodiment, the first connector 40 includes a first housing 41 and a first terminal 42 mounted in the first housing 41. The flexible lead 21 of the temperature sensor 20 is electrically connected to the first terminal 42. The first terminal 42 of the first connector 40 is adapted to mate with the input end 121 of the connection terminal 123 of the electrical adapter 10 to electrically connect the flexible lead 21 of the temperature sensor 20 to the input end 121 of the connection terminal 123.

As shown in FIGS. 1 to 6, in the illustrated embodiment, the first connector 40 includes two first terminals 42. The two flexible leads 21 of the temperature sensor 20 are electrically connected to the two first terminals 42 of the first connector 40, respectively. The two first terminals 42 of the first connector 40 are mated with the input ends 121 of the two connection terminals 123 of the electrical adapter 10. In the illustrated embodiment, the first terminal 42 is crimped to the flexible lead 21. However, the present invention is not limited to the illustrated embodiment. For example, the flexible lead 21 can also be welded or riveted to the first terminal 42.

As shown in FIGS. 1 to 6, in the illustrated embodiment, a first slot 112 for inserting the first connector 40 is formed on the body 110 of the electric adapter 10, and the input end 121 of the connection terminal 123 is arranged in the first slot 112. When the first connector 40 is inserted into the first slot 112, the first terminal 42 of the first connector 40 is mated with the input end 121 in the first slot 112.

As shown in FIGS. 1 to 6, in the illustrated embodiment, a first protrusion 41a is formed on one of the first housing 41 of the first connector 40 and the inner wall of the first slot 112, and a first snap slot (not shown) is formed on the other. When the first connector 40 is inserted into the first slot 112, the first protrusion 41a is snapped into the first snap slot to lock the first connector 40 in the first slot 112.

As shown in FIGS. 1 to 6, in the illustrated embodiment, the flexible lead 21 of the temperature sensor 20 is electrically connected to the input end 121 of the connection terminal 123 through the first connector 40. However, the present invention is not limited to the illustrated embodiment, and the flexible lead 21 of the temperature sensor 20 can also be directly welded, riveted or crimped to the input end 121 of the connection terminal 123.

As shown in FIGS. 1 to 6, in the illustrated embodiment, the electronic assembly 1 also includes a heat conduction pad 30. The heat conduction pad 30 is installed on the body 110 for thermal contact with the charging terminal. The temperature sensor 20 is installed in the heat conduction pad 30 to be thermally connected to the charging terminal via the heat conduction pad 30.

As shown in FIGS. 1 to 6, in the illustrated embodiment, a socket is formed in the heat conduction pad 30, and the temperature sensor 20 is inserted into the socket of the heat conduction pad 30. However, the present invention is not limited to the illustrated embodiment. For example, in another embodiment of the present invention, the heat conduction pad 30 may be formed on the temperature sensor 20 by insert injection molding, and the temperature sensor 20 may be encapsulated in the heat conduction pad 30.

As shown in FIGS. 1 to 6, in the illustrated embodiment, a mounting slot 111 is formed on the body 110 of the electric adapter 10, and the heat conduction pad 30 is installed in the mounting slot 111. However, the present invention is not limited to this. For example, in another embodiment of the present invention, a positioning column can be formed on the body 110, and a positioning hole mated with the positioning column can be formed on the heat conduction pad 30. In this way, the heat conduction pad 30 can be fixed on the body 110 of the electric adapter 10 through the cooperation of the positioning column and the positioning hole.

As shown in FIGS. 1 to 6, in the illustrated embodiment, the output end 122 of the connection terminal 123 is arranged on the body 110. The electrical connection structure between the input end 121 and the output end 122 of the connection terminal 123 is arranged in the body 110 for electrically connecting the input end 121 to the output end 122. In the illustrated embodiment, the body 110 wraps all or part of the electrical connection structure of the connection terminal 123 so that all or part of the electrical connection structure of the connection terminal 123 is encapsulated in the body 110.

As shown in FIGS. 1 to 6, in the illustrated embodiment, a second slot 113 for inserting a second connector (not shown) is formed on the body 110, and the output end 122 of the connection terminal 123 is arranged in the second slot 113. When the second connector is inserted into the second slot 113, the second terminal of the second connector is matched with the output end 122 in the second slot 113 to electrically connect the output end 122 to a control system of an electric vehicle.

Figure 7:
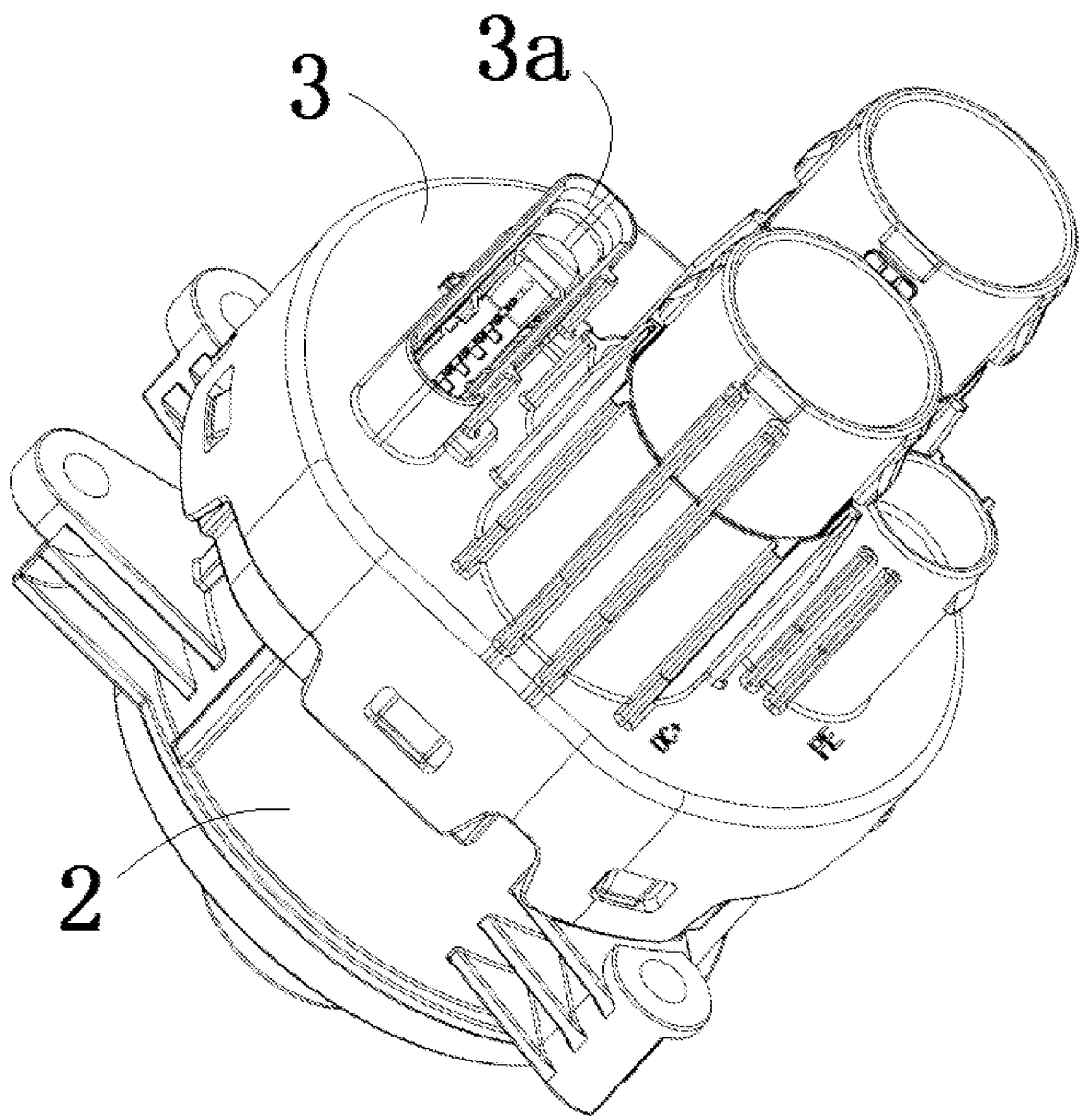
FIG. 7 shows a three-dimensional schematic diagram of a charging socket according to an exemplary embodiment of the present invention, wherein the rear cover of the charging socket is installed on the housing.

FIG. 7 shows a three-dimensional schematic diagram of a charging socket according to an exemplary embodiment of the present invention, wherein the charging socket rear cover 3 is installed on the housing 2.

As shown in FIGS. 1 and 7, in the illustrated embodiment, the charging socket also includes a rear cover 3, which is fixedly connected with the rear end of the housing 2 to form a rear end cavity with the housing 2. The flexible lead 21 of the temperature sensor 20 is completely arranged in the rear end cavity.

As shown in FIG. 7, in the illustrated embodiment, the second connector can be inserted into the second slot 113 of the electric adapter 10 through an insertion port 3a formed on the rear cover 3 to match with the output end 122 in the second slot 113.

Although not shown, in an exemplary embodiment of the present invention, a second protrusion is formed on one of a second housing of the second connector and the inner wall of the second slot 113, and a second snap slot is formed on the other. When the second connector is inserted into the second slot 113, the second protrusion is buckled into the second snap slot to lock the second connector in the second slot 113.

As shown in FIGS. 1 to 6, in the illustrated embodiment, the input end 121 of the connection terminal 123 is a pin. The pin type input end 121 is adapted to be inserted into the first terminal 42 of the first connector 40 to electrically contact with the first terminal 42.

As shown in FIGS. 1 to 7, in the illustrated embodiment, the electric adapter 10 is an integral part formed by insert injection molding; The connection terminal 123 is an insert part; The body 110 is an injection molded part. The input end 121 and the output end 122 of the connection terminal 123 extend outside the body 110 respectively for electrical connection.

In the embodiments shown in FIGS. 1 to 7, the electrical adapter 10 is a lead frame, and the body 110 is a frame body of the lead frame. However, the present invention is not limited to the illustrated embodiment. For example, in another exemplary embodiment of the present invention, the electric adapter 10 may also be a circuit board.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A charging socket, comprising:
   a housing;
   an electric adapter installed in the housing;
   a heat conduction pad positioned to engage a charging terminal positioned in the housing, the heat conduction pad having a socket provided therein;
   a temperature sensor removably positioned in the socket of the heat conduction pad, the temperature sensor configured to detect the temperature of the charging terminal,
   the electric adapter comprises a body and connection terminals provided in the body, and the connection terminals have input ends and output ends,
   the temperature sensor has flexible leads that extend from the temperature sensor;
   a first connector extending from ends of the flexible lead which are removed from the temperature sensor, which terminals of the first connector are electrically connected to the input ends of the connection terminals, so as to transmit the sensing signal of the temperature sensor to the output ends of the connection terminals;
   wherein the temperature sensor is installed in the heat conduction pad to be thermally connected with the charging terminal via the heat conduction pad.

2. The charging socket according to claim 1, wherein the electric adapter is a lead frame, and the body is a frame body of the lead frame;
   a first slot for inserting the first connector is formed on the body, and the input ends of the connection terminals are arranged in the first slot;
   when the first connector is inserted into the first slot, the first terminals of the first connector are mated with the input ends arranged in the first slot.

3. The charging socket according to claim 2, wherein
   a first protrusion is formed on one of the a first housing of the first connector and an inner wall of the first slot;
   when the first connector is inserted into the first slot, the first protrusion locks the first connector in the first slot.

4. The charging socket according to claim 1, wherein
   the electric adapter is a lead frame, and the body is a frame body of the lead frame;
   a mounting slot is formed on the body, and the heat conduction pad is installed in the mounting slot.

5. The charging socket according to claim 1, wherein
   the electric adapter is a lead frame, and the body is a frame body of the lead frame;
   the heat conduction pad is fixedly installed on the body.

6. The charging socket according to claim 2, wherein
   the electric adapter is a lead frame, and the body is a frame body of the lead frame;
   a second slot for inserting a second connector is formed on the body, and second output ends of the output ends of the connection terminals are arranged in the second slot;
   when the second connector is inserted into the second slot, a second terminal of the second connector is mated with the output end of the connection terminal to electrically connect the output end of the connection terminal to a control system of an electric vehicle.

7. The charging socket according to claim 1, wherein the electric adapter is a circuit board.

8. The charging socket according to claim 1, wherein
   the electric adapter is an integral part formed by insert injection molding, the connection terminal is an insert part, and the body is an injection molded part formed on the connection terminal;
   the input ends and the output ends of the connection terminals extend outside the body respectively for electrical connection.

9. The charging socket according to claim 1, further comprising:
   a rear cover fixedly connected with a rear end of the housing to form a rear end cavity;
   wherein the flexible leads of the temperature sensor are completely arranged in the rear end cavity.

* * * * *